US009495525B2

United States Patent
Grigg et al.

(10) Patent No.: US 9,495,525 B2
(45) Date of Patent: *Nov. 15, 2016

(54) RHYTHM-BASED USER AUTHENTICATION

(71) Applicant: BANK OF AMERICA CORPORATION, Charlotte, NC (US)

(72) Inventors: David M. Grigg, Rock Hill, SC (US); Richard Andrew Starbuck, Walnut Creek, CA (US); Carrie Anne Hanson, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,399

(22) Filed: Feb. 18, 2016

(65) Prior Publication Data

US 2016/0162672 A1   Jun. 9, 2016

Related U.S. Application Data

(63) Continuation of application No. 14/968,731, filed on Dec. 14, 2015, which is a continuation of application No. 14/249,752, filed on Apr. 10, 2014, now Pat. No. 9,213,819.

(51) Int. Cl.
*G06F 7/04* (2006.01)
*G06F 21/31* (2013.01)
(Continued)

(52) U.S. Cl.
CPC ........... *G06F 21/316* (2013.01); *G06F 3/0488* (2013.01); *G06F 21/31* (2013.01); *G06F 21/32* (2013.01); *G06F 21/35* (2013.01); *G06F 21/36* (2013.01); *H04L 63/08* (2013.01)

(58) Field of Classification Search
CPC ........ G06F 21/31; G06F 21/46; G06F 3/017; G06F 1/1694
USPC .......................................................... 726/7
See application file for complete search history.

(56) References Cited

U.S. PATENT DOCUMENTS 2,014,006 A    9/1935  Morrison
6,954,862 B2  10/2005  Serpa
(Continued)

OTHER PUBLICATIONS

Wobbrock, TapSongs: Tapping Rhythm-Based Passwords on a Single Binary Sensor, ACM, Oct. 7, 2009, pp. 93-96.*
(Continued)

*Primary Examiner* — Christopher Brown
*Assistant Examiner* — Jenise Jackson
(74) *Attorney, Agent, or Firm* — Michael A. Springs; Moore and Van Allen PLLC; W. Kevin Ransom

(57) ABSTRACT

The present invention is directed to an apparatus, a method, and a computer program product for authenticating a user based on a sequence of rhythmic inputs. The user via a mobile device provides one or more inputs (e.g., pushing a button, tapping a touchscreen, a biometric, or the like) to one or more sensors associated with the mobile device as an attempt of authorization. The one or more inputs may be provided in a rhythmic manner (e.g., provided in time with music). The present invention then compares the provided one or more inputs to one or more predetermined sequences of inputs that are associated with positive authentication of the user (e.g., a known password). The phone determines that the one or more provided inputs match one or more predetermined rhythmic sequences associated with positive authentication of the user and authenticates the user.

28 Claims, 3 Drawing Sheets

(51) Int. Cl.
*G06F 21/32* (2013.01)
*H04L 29/06* (2006.01)
*G06F 3/0488* (2013.01)
*G06F 21/36* (2013.01)
*G06F 21/35* (2013.01)

(56) References Cited

U.S. PATENT DOCUMENTS

| | | | |
|---|---|---|---|
| 7,349,557 | B2 | 3/2008 | Tibor |
| 7,398,253 | B1 | 7/2008 | Pinnell |
| 7,536,556 | B2* | 5/2009 | Fedorova ................ G06F 21/36 713/182 |
| 7,606,770 | B2 | 10/2009 | Pinnell |
| 7,716,129 | B1 | 5/2010 | Tan et al. |
| 8,485,422 | B2 | 7/2013 | Rometty et al. |
| 8,490,865 | B2 | 7/2013 | Randazza et al. |
| 8,539,550 | B1* | 9/2013 | Terres .................... G06F 21/31 726/16 |
| 8,719,922 | B2* | 5/2014 | Ooi ........................ G06F 21/36 725/28 |
| 2008/0049984 | A1* | 2/2008 | Poo ........................ G06F 21/32 382/115 |
| 2009/0094690 | A1* | 4/2009 | Hayashi .................. G06F 21/31 726/7 |
| 2009/0146947 | A1 | 6/2009 | Ng |
| 2011/0078236 | A1* | 3/2011 | Olsen, Jr. .............. H04L 63/104 709/203 |
| 2011/0162066 | A1* | 6/2011 | Kim ........................ G06F 3/017 726/18 |
| 2012/0152088 | A1 | 6/2012 | Ikeya et al. |
| 2012/0203700 | A1 | 8/2012 | Ornce et al. |
| 2012/0222093 | A1* | 8/2012 | Badenes ................. G06F 21/46 726/4 |
| 2012/0272288 | A1* | 10/2012 | Ashbrook ............... G06F 21/32 726/1 |
| 2013/0104227 | A1* | 4/2013 | Dow ....................... G06F 21/31 726/19 |
| 2013/0110658 | A1 | 5/2013 | Lyman et al. |
| 2013/0212024 | A1 | 8/2013 | Mattsson et al. |
| 2013/0246203 | A1 | 9/2013 | Laracey |
| 2013/0246258 | A1 | 9/2013 | Dessert |
| 2013/0246260 | A1 | 9/2013 | Barten et al. |
| 2013/0326604 | A1 | 12/2013 | Hird |
| 2014/0006190 | A1 | 1/2014 | Loomis, III et al. |
| 2014/0337941 | A1* | 11/2014 | Kominar ................. G06F 21/45 726/6 |
| 2015/0040192 | A1* | 2/2015 | Kobold ................. H04L 63/083 726/4 |
| 2015/0103018 | A1* | 4/2015 | Kamin-Lyndgaard . G09G 5/006 345/173 |

OTHER PUBLICATIONS

K.N. et al, Improved Authentication Mechanism Using Keystroke Analysis, IEEE, Mar. 9, 2007, pp. 258-261.*
Soh, A Novel Web Security Evaluation Model for a One-time Password System, IEEE, 2003, pp. 1-4.
Tan et al, Sequential Rhythmic Information Retrieval for Audio Similarity Matching, IEEE, 2009, pp. 1-5.
Alen Peacock et al., Typing Patterns: A Key to User Identification; Massachusetts Institute of Technology; IEEE Computer Society, 2004, IEEE, pp. 40-47.
Marcus Karnan et al., Bio Password—Keystroke Dynamic Approach to Secure Mobile Devices, 2010, pp. 1-4.

* cited by examiner

RHYTHM-BASED USER AUTHENTICATION

CROSS-REFERENCE TO RELATED APPLICATIONS

This application is a continuation of U.S. patent application Ser. No. 14/968,731, filed on Dec. 14, 2015, which in turn is a continuation of U.S. patent application Ser. No. 14/249,752, filed Apr. 10, 2014 of the same title and issuing as U.S. Pat. No. 9,213,819 on Dec. 15, 2015; the contents of which are hereby incorporated by reference.

BACKGROUND

When attempting to execute a transaction, access a function, or perform an action, a user may be required to present one or more authentication credentials to continue or complete execution. Currently, sight-impaired users have few options for authentication and may require auditory means for authentication. Furthermore, musically-inclined users have limited authentication options that include music or enable users to input rhythmic patterns. Clearly, there is a need to authenticate users based on a plurality of rhythmic inputs.

BRIEF SUMMARY

The present invention is directed to apparatuses, systems, methods, and computer-program products for authenticating a user based on a received sequence of rhythmic inputs. The inputs can be a variety of input types, including interactions via a touchscreen, engaging buttons associated with the apparatus, actions within an application or operating system associated with the apparatus, or other input types. In some embodiments, the user may utilize a wearable computing device such as a bracelet, a ring, or the like to communicate the inputs to the apparatus. A plurality of sensors detects and receives a combination of inputs from the user. The apparatus receives a combination of inputs, which is compared to one or more predetermined rhythmic sequences or patterns associated with positive authentication of the user. The apparatus then determines that the received combination of inputs matches the one or more predetermined rhythmic sequences or patterns. And, once the match is determined, the user is authenticated. If a match is not determined, the user is not authenticated or further authentication credentials may be required for authentication.

In some embodiments, an apparatus for authenticating a user based on a predetermined rhythmic pattern is provided. The apparatus includes a memory, a processor and a module stored in memory that is executable by the processor. The module is configured to receive, via at least one sensor, a plurality of rhythmic inputs from the user and process the plurality of rhythmic inputs. Processing of the plurality of rhythmic inputs includes comparing the plurality of rhythmic inputs to at least one predetermined rhythmic pattern associated with authentication of the user and determining that the plurality of rhythmic inputs matches at least one predetermined rhythmic pattern associated with authentication of the user. In addition, the module is configured to authenticate the user in response to determining that the plurality of rhythmic inputs matches at least one predetermined rhythmic pattern associated with authentication of the user.

In some embodiments, the apparatus further comprises a wearable computing device that includes the sensor and is configured to sense the plurality of rhythmic inputs and communicate the plurality of rhythmic inputs to the module.

In some embodiments, the wearable computing device is at least one of a bracelet, a ring, a watch, glasses, jewelry, a pen, or a stylus.

In some embodiments, the apparatus is at least one of a smart phone, a tablet, a laptop, a computer, a mobile device, a personal digital assistant (PDA), or a touch screen computer.

In some embodiments, the at least one sensor is associated with at least one of a touchscreen, a button associated with the apparatus, an application associated with the apparatus, or an operating system associated with the apparatus.

In some embodiments, the plurality of rhythmic inputs includes at least one of a button push, a button slide, a button hold, a button tap, a touchscreen swipe, a touchscreen push, a touchscreen slide, a touchscreen tap, a touchscreen hold, a touchscreen swim, a mouse click, a scroll, a toggle, a selection, a zoom, a knock, a download, a biometric interaction, an upload, or an action.

In some embodiments, the plurality of rhythmic inputs is received via the at least one sensor as a rhythmic sequence of inputs spaced out by the user over a predetermined period of time.

In some embodiments, the apparatus is configured to play music, wherein the apparatus receives the plurality of rhythmic inputs from the user in time with music, wherein the music is played only when headphones are coupled to the apparatus.

In some embodiments, processing the plurality of rhythmic inputs includes determining at least one of a rhythm, a tempo, a velocity, a length, a pitch, or a duration of the inputs.

In some embodiments, determining if the plurality of rhythmic inputs matches at least one predetermined rhythmic pattern associated with authentication of the user includes determining at least a partial match between the plurality of rhythmic inputs and at least one predetermined rhythmic pattern.

In some embodiments, determining a partial match between the plurality of rhythmic inputs and at least one predetermined rhythmic pattern provides partial authentication of the user, wherein partial authentication of the user comprises partially restricted user access, wherein additional authentication of the user is required for full user access.

In some embodiments, the at least one predetermined rhythmic pattern is configurable by the user.

In some embodiments, the at least one predetermined rhythmic pattern is associated with authentication of more than one user.

In some embodiments, authenticating the user includes executing an action, wherein the action is at least one of a transaction, a viewing of a summary of information, a deposit, a withdrawal, a selection, a download, an upload, a zoom, a scroll, a click, or a slide.

In some embodiments, authentication of the user is denied based on determining that the plurality of rhythmic inputs does not at least partially match at least one predetermined rhythmic pattern, wherein denying authentication of the user prompts the user via an interface for reattempting authentication of the user.

In some embodiments, at least one of the plurality of rhythmic inputs or the at least one predetermined rhythmic pattern includes a combination of different inputs.

In some embodiments, determining if the plurality of rhythmic inputs matches at least one predetermined rhythmic pattern associated with authentication of the user includes determining a level of complexity associated with the plurality of rhythmic inputs, wherein the level of complexity associated with the plurality of rhythmic inputs corresponds to a level of user access.

In some embodiments, a predeterminedly high level of complexity corresponds to a predeterminedly high level of user access and a predeterminedly low level of complexity corresponds to a predeterminedly low level of user access.

In some embodiments, a method for authenticating a user based on a rhythmic pattern is provided. The method comprises receiving, via at least one sensor, a plurality of rhythmic inputs from the user. The method further comprises processing the plurality of rhythmic inputs, wherein processing the plurality of rhythmic inputs includes comparing the plurality of rhythmic inputs to at least one predetermined rhythmic pattern associated with authentication of the user to determine that the plurality of rhythmic inputs matches at least one predetermined rhythmic pattern associated with authentication of the user. Furthermore, the method comprises authenticating the user in response to determining that the plurality of rhythmic inputs matches at least one predetermined rhythmic pattern associated with authentication of the user.

In some embodiments, a computer-program product for authenticating a user based on a rhythmic pattern is provided. The computer-program product comprises a non-transitory computer-readable medium comprising code causing an apparatus to receive, via at least one sensor, a plurality of rhythmic inputs from the user. The computer-program product further causes the apparatus to process the plurality of rhythmic inputs, wherein processing the plurality of rhythmic inputs includes comparing the plurality of rhythmic inputs to at least one predetermined rhythmic pattern associated with authentication of the user to determine that the plurality of rhythmic inputs matches at least one predetermined rhythmic pattern associated with authentication of the user. Furthermore, the computer-program product causes the apparatus to authenticate the user in response to determining that the plurality of rhythmic inputs matches at least one predetermined rhythmic pattern associated with authentication of the user.

Rhythm-based user authentication provides many benefits. First, the present invention provides an additional level of authentication that ensures privacy, confidentiality, and security in operation of the apparatus associated with the user. In theory, only a person who knew the proper predetermined rhythmic sequence would be enabled to authenticate himself. Additionally, rhythm-based user authentication may provide the user with a quicker method of authentication than authenticating via other methods, such as entering a username and password, a personal identification number (PIN), or the like. Furthermore, rhythm-based user authentication may elicit a positive emotional response from the user. The user may be presented with a portion of a favorite audio clip (e.g., a song, a tune, a beat, a melody, or the like) and will knock, tap, or push buttons in time with the audio clip for authentication. Therefore, the user may consciously or subconsciously feel an emotional reward for using rhythm-based user authentication and may receive significant social benefits amongst his or her social circles.

BRIEF DESCRIPTION OF THE DRAWINGS

Figure 1:
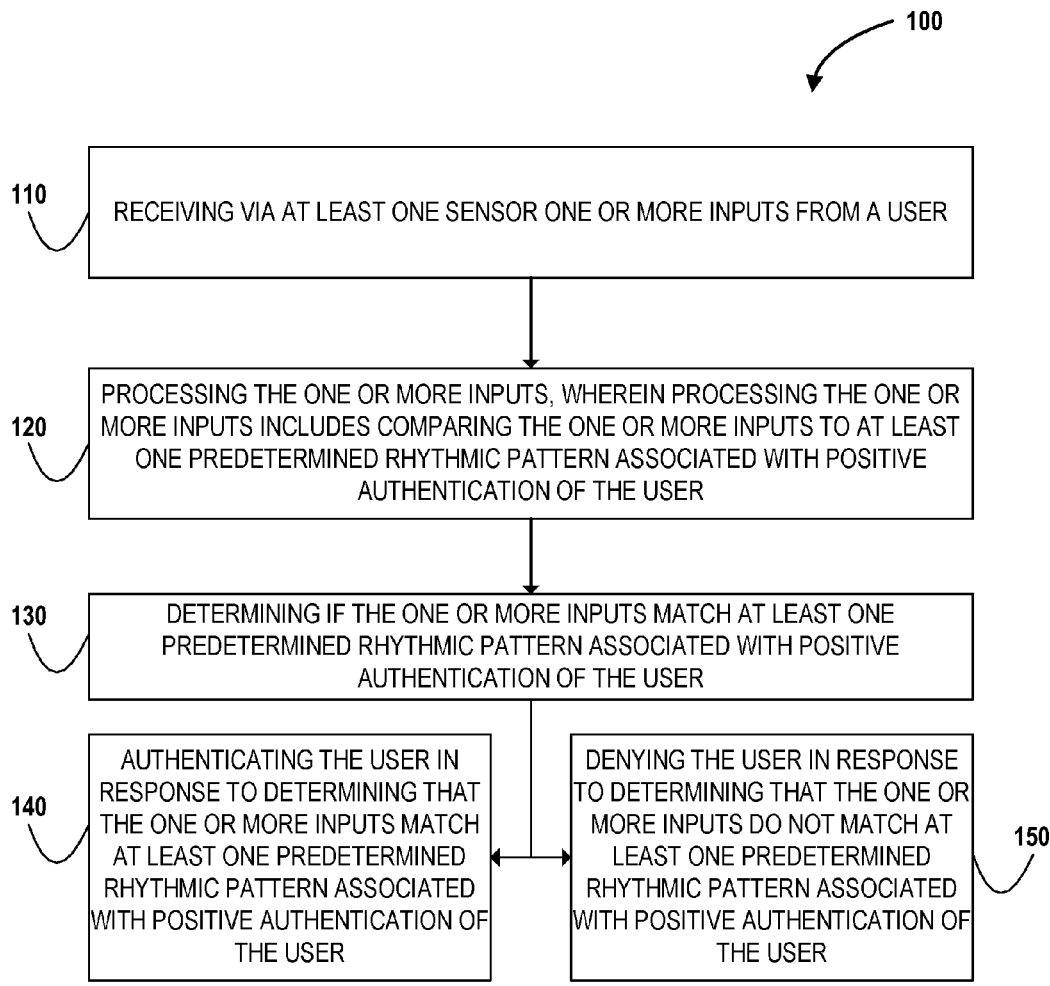
Figure 2:
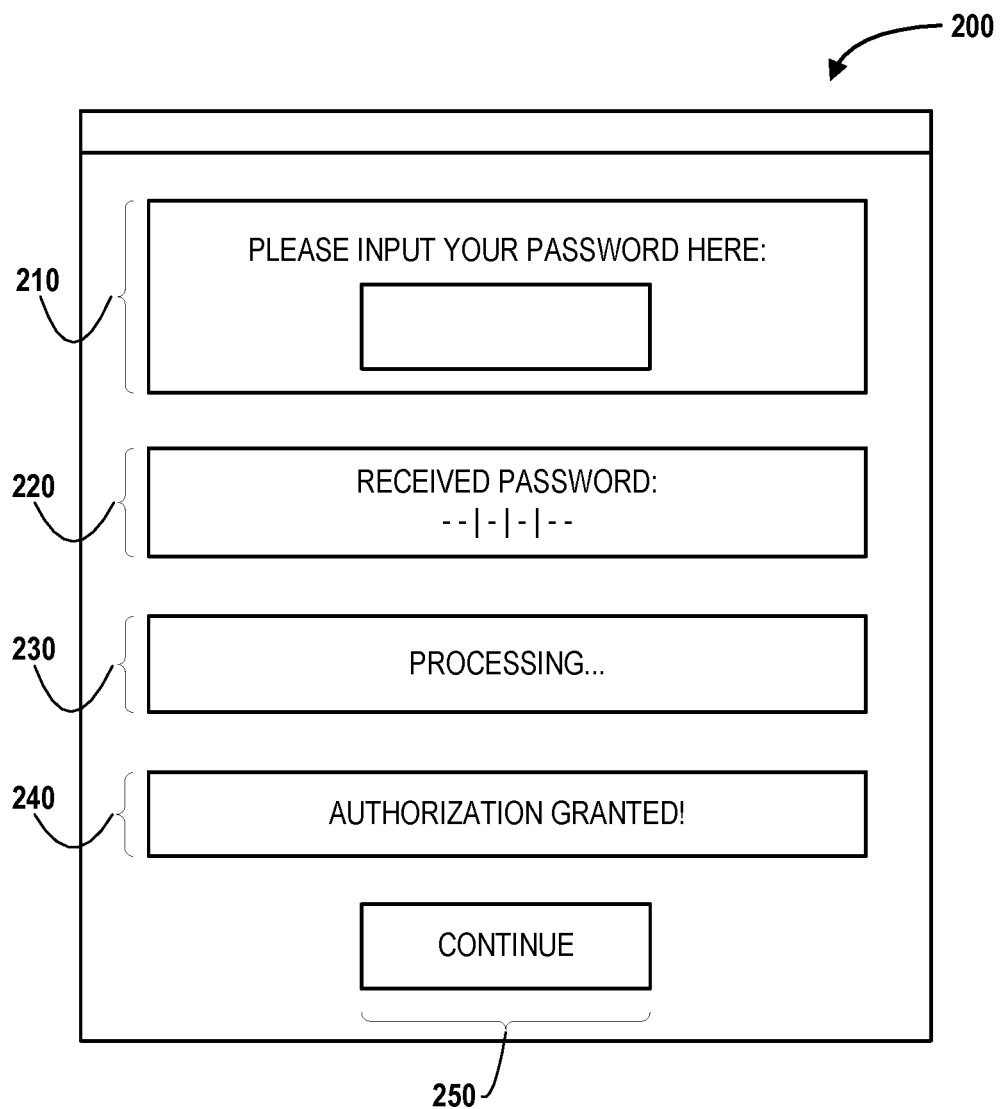
Figure 3:
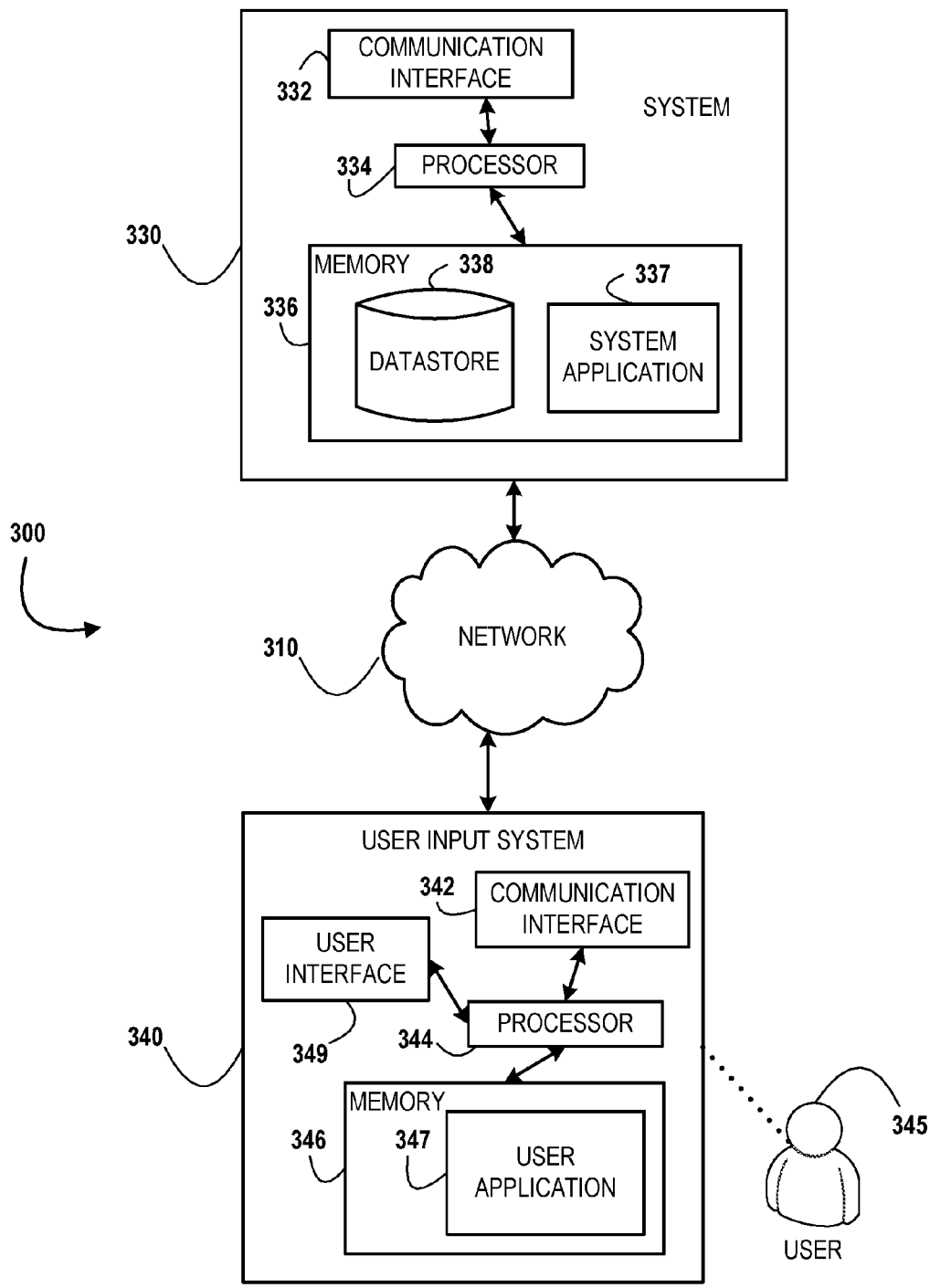

Having thus described embodiments of the invention in general terms, reference will now be made to the accompanying drawings, where:

FIG. 1 is an exemplary process flow illustrating a process for authenticating a user based on a received rhythmic series of inputs, in accordance with embodiments of the present invention;

FIG. 2 is an exemplary user interface for authenticating a user based on a received rhythmic series of inputs, in accordance with embodiments of the present invention; and FIG. 3 is an exemplary block diagram illustrating technical components of a system for authenticating a user based on a received rhythmic series of inputs, in accordance with embodiments of the present invention.

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

The present invention is directed to apparatus, systems, methods and computer program products that enable a user (e.g., a customer, an online banking user, a mobile banking user, a bank teller, an administrator, an associate or agent associated with the entity, or the like) to authenticate herself or himself via a rhythm-based user authentication system. The user is enabled to configure a predetermined rhythm (e.g., a rhythmic pattern or sequence) of various inputs (e.g., engaging a button on a mobile device, tapping a touchscreen, or the like) that serves as authentication credentials for user authentication. The user is authenticated upon successful determination that a received sequence of user inputs matches at least partially the predetermined rhythmic password.

For example, in the event the user wants to use his smart phone to transfer funds from his checking account to his savings account, both of which are associated with the entity. The user opens a mobile banking application via his smart phone. Via the mobile banking application, the user requests to execute a transfer of funds between his checking account and savings account. The mobile banking application, configured to prompt the user for authentication, prompts the user for authentication via an interface, and begins to play music via a speaker associated with the mobile device. The user provides to the mobile banking application a series of inputs—two taps on a screen associated with the mobile device, a button hold on a volume button on the side of the mobile device, and a swipe across the screen associated with the mobile device. The inputs are provided in a rhythmic pattern to match a tempo associated with the playing music. The mobile banking application receives the inputs and analyzes the inputs to determine if the received inputs match a predetermined rhythmic sequence or pattern of inputs (e.g., a password) that is associated with positive authentication of the user. Upon determining that the received inputs indeed match the predetermined rhythmic sequence of inputs, the mobile banking application authenticates the user and enables the user to continue in transferring funds between his checking account and savings account.

Referring now to the Figures, FIG. 1 is an exemplary process flow 100 for authenticating a user based on a received rhythmic series of inputs. At block 110, the process includes receiving via at least one sensor one or more inputs from a user. At block 120, the process includes processing the one or more inputs, wherein processing the one or more inputs includes comparing the one or more inputs to at least one predetermined rhythmic pattern associated with positive authentication of the user. At block 130, the process includes determining if the one or more inputs match at least one predetermined rhythmic pattern associated with positive authentication of the user. At block 140, the process includes authenticating the user in response to determining that the one or more inputs match at least one predetermined rhythmic pattern associated with positive authentication of the user. At block 150, the process includes denying the user in response to determining that the one or more inputs do not match at least one predetermined rhythmic pattern associated with positive authentication of the user.

FIG. 2 is an exemplary user interface 200 for authenticating a user based on a received rhythmic series of inputs. The exemplary interface 200 may be presented to the user when user authentication is required to execute an action. For example, the apparatus may present the interface 200 to the user for authentication when unlocking a mobile device, when attempting to execute a transaction, view or access information (e.g., account information, contact information, an account balance, or the like), make a withdrawal or deposit, or another function that requires authentication, when making a selection, when opening an application, when closing an application, when downloading data, when uploading data, when starting or shutting down an operating system, or the like. In some embodiments, the user is enabled to configure which actions or functions require user authentication. In other embodiments, the apparatus is configured by a third party (e.g., an administrator, a manager, an access review specialist, or the like).

The apparatus is typically associated with a mobile device (e.g., a smart phone, a personal digital assistant (PDA), a tablet, a laptop computer, a desktop computer, a smart watch, a wearable computing device such as a ring, a bracelet, or other jewelry, or the like). The mobile device is configured to display the interface 200. The mobile device also includes at least one touch screen, at least one button, a combination of buttons and screens, or the like. The apparatus is further integrated with an application or operating system installed or accessed by the mobile device.

The interface 200 typically directs the user through the user authentication process. Via the interface 200, the apparatus prompts the user for input of a password 210 via a message, a notification, an alert, or the like as shown in FIG. 2. The user may transmit many types of inputs, including inputs associated with the mobile device such as a button press, a button hold, a button tap, a button slide, a touch screen tap, a touch screen hold, a touch screen press or selection, a touch screen swim, a mouse click, a scroll, a toggle, a selection, a zoom, a knock, a download, a biometric interaction, an upload, or an action.

In some embodiments, the apparatus is configured to play audio, video, music, or another type of media, or show an image, present a game or puzzle, or the like during the authentication process. This enables the user to tap, knock, or generate inputs in rhythm with the playing media. The apparatus keeps record of information associated with the media, including a rhythm, a tempo, a velocity, a pitch, a length, or the like. This information is used to determine if any received inputs match the information associated with the playing media. In other embodiments, no media is played during the authentication process.

For example, the predetermined rhythmic pattern may be configured to follow along with an instrument or vocal melody in a song. The user, upon hearing her or his predetermined music playing as initiated by the apparatus, taps out a rhythm of a kick drum using a sensor associated with the second (wearable) device, such as an accelerometer, a touch sensor, a touch screen, a capacitor, a biometric scan, or the like. These taps are received by the apparatus, which then processes the taps to potentially authenticate the user.

The apparatus may play the music upon prompting the user for authentication. In other embodiments, the apparatus may only play music when headphones are coupled to the apparatus, or upon opening of an application, unlocking of a device, or the like. The user may further be required to select a song or other media to initiate playback.

Rhythmic inputs are defined as a series of inputs spaced out by a user over a period of time so as to create a rhythm. The apparatus, via processing, is configured to determine characteristics associated with the series of inputs and identify any rhythms found in the series of inputs.

The apparatus receives one or more inputs or a string of inputs via at least one sensor associated with the mobile device. Sensors may be integrated into the mobile device, such as on a mobile device button, or may be integrated within software installed on the mobile device (e.g., within the application or operating system). The sensors are configured to determine at least an input type, an input length, an input duration, an input time (e.g., the time at which the input was received), a length of time between receiving multiple inputs, a rhythm, a tempo, a velocity, a pitch, or the like of each input.

In some embodiments, inputs may be generated by the user via a second device. The second device may be a wearable computer, such as a ring, a bracelet, a pen, a stylus, a necklace, glasses, or any other device that may be worn on or carried by a body that includes a sensor (e.g., a touch sensor). The user touches the sensor associated with the second device to the apparatus so that an input is received by the sensor associated with the mobile device. In some embodiments, the sensor associated with the second device may be the sensor associated with the mobile device. In other embodiments, the user generates the input via a biometric (e.g., physically touching a screen or button, a fingerprint scan, a retina scan, or the like), a textual numerical input, or the like.

The apparatus may include a space on a touchscreen, a button, or another surface that is designated or configured to receive inputs from the user, such as the block in the input prompt 210 of FIG. 2. The space may define pixel dimensions such as a length and a width that is configured to receive inputs via a sensor. In other embodiments, the apparatus may include no designated space for sensing inputs, or the entirety of the apparatus may be configured to sense inputs via one or more sensors. The apparatus is configured to determine a location associated with the sensed input. For example, the apparatus may use pixels to identify the location of a sensed input. The apparatus is further configured to store each received input, as well as information associated with the input (e.g., input type, tempo, velocity, or the like) in a storage location in memory. Alternatively, user authentication may be required to be inputted into a designated, customizable area, which in some embodiments is scalable, configurable, modifiable, or the like by the user. The apparatus may display the received input 220 as seen in the interface 200 in FIG. 2.

Once received, the inputs are processed by the apparatus, which may display a processing status 230 via the interface 200 as illustrated in FIG. 2. Processing of the received inputs includes determining a rhythmic sequence, pattern, or arrangement of the received inputs. The apparatus determines a rhythmic sequence of the received inputs by analyzing the received inputs for input type, or the like. The apparatus may also quantize the inputs to create more uniform spacing between received inputs or different input types or in sync with a determined tempo.

The apparatus compares the determined rhythmic sequence of inputs to one or more stored predetermined rhythmic sequences associated with positive authentication of the user (e.g., the user's password). The apparatus may also compare the determined rhythmic sequence of inputs to information associated with the media file, if media was playing during an authentication attempt, to help in the analysis of the authentication of the received sequence of inputs. In some embodiments, an algorithm may be used to determine the authenticity of the received sequence of inputs.

The user is typically enabled to configure the rhythmic pattern or sequence of inputs (e.g., the password). The apparatus may provide means for editing, modifying, changing, adding, or deleting a password for one or more users. Multiple users may share the same password, or multiple users may each have his or her own unique password. In other embodiments, an administrator may configure the password for one or more users.

The apparatus determines if the determined rhythmic sequence of received inputs matches one or more predetermined rhythmic sequences associated with positive authentication of the user. The apparatus is configured to determine the identity of the user through the manner in which the inputs are received. The apparatus may analyze the inputs and information associated with the inputs (e.g., input type, rhythm, tempo, or the like) to authenticate the user.

In some embodiments, the determined rhythmic sequence of received inputs completely matches one or more predetermined rhythmic sequences associated with positive authentication of the user. In other embodiments, the determined rhythmic sequence of received inputs partially matches one or more predetermined rhythmic sequences associated with positive authentication of the user. In alternative embodiments, the determined rhythmic sequence of received inputs does not match one or more predetermined rhythmic sequences associated with positive authentication of the user.

Based on determining a match between the determined rhythmic sequence of received inputs and one or more predetermined rhythmic sequences associated with positive authentication of the user, the apparatus may authenticate the user to various levels of authentication. For example, if there is a complete match, the user is fully authenticated and has full access to all functions within an application. If there is a partial match, the user is partially authenticated and has access to some functions within an application, and does not have access to other functions within the application. If there is no match, the user is denied and does not have access to any functions within the application. The levels of authentication are predetermined and configurable by the user. The user may select which functions within an application are accessible to a user of each level of authentication.

The level of authentication may further be defined by a level of complexity associated with the received sequence of inputs or one or more predetermined rhythmic sequences of associated with positive authentication of the user. For example, if a received rhythmic sequence of inputs is short in length or contains a number of inputs smaller than a predetermined threshold value, then, upon positive determination that the received rhythmic sequence of inputs at least partially matches a predetermined rhythmic sequence associated with positive authentication of the user, the user is partially authenticated. Conversely, if a received rhythmic sequence of inputs is long in length or contains a number of inputs larger than a predetermined threshold value, then, upon positive determination that the received rhythmic sequence of inputs at least partially matches a predetermined rhythmic sequence associated with positive authentication of the user, the user is fully authenticated.

Upon successful authentication of the user, the apparatus may be configured to execute an action substantially simultaneously to or after positive authentication is determined. The apparatus is configured to execute at least one of a transaction, a viewing of information, a deposit, a withdrawal, a selection, a download, an upload, a zoom, a scroll, a click, or a slide. Other actions may be executed depending on the application, device, or operating system within which the apparatus is integrated. The user may be required to select "Continue" 250 to initiate execution of the action.

Upon failed authentication of the user, the apparatus is configured to present to the user a second interface for reattempting user authentication. The apparatus may also close an application, require additional authentication, turn off a device associated with the apparatus, or perform another action.

The present invention may further be coupled with additional layers of authentication and so the apparatus may prompt the user for additional authentication credentials such as a password, an answer to a security question, a personal identification number (PIN), a puzzle, a biometric, or the like. The apparatus may also utilize location information (global positioning system (GPS) coordinates, longitude and latitude, proximity to landmarks or transmission towers, or the like) to authenticate the user. User access to various functions may require one or more additional layers of authentication.

FIG. 3 is an exemplary block diagram illustrating technical components of a system 300 for authenticating a user based on a received rhythmic series of inputs as described in the process flow described in FIG. 1 and the exemplary interface in FIG. 2. As illustrated, the system environment 300 includes a network 310, a system 330, and a user input system 340. Also shown in FIG. 3 is a user 345 of the user input system 340. The user input system 340 may be any computing device. The user 345 may be a person who uses the user input system 340 to execute a user application 347. The user application 347 may be an application to communicate with the system 330, perform a transaction, input information onto a user interface presented on the user input system 340, or the like. The user application 347 and/or the system application 337 may incorporate one or more parts of any process flow described herein.

As shown in FIG. 3, the system 330, and the user input system 340 are each operatively and selectively connected to the network 310, which may include one or more separate networks. In addition, the network 310 may include a telecommunication network, local area network (LAN), a wide area network (WAN), and/or a global area network (GAN), such as the Internet. It will also be understood that the network 310 is secure and may also include wireless and/or wireline and/or optical interconnection technology.

The user input system 340 may include any computerized apparatus that can be configured to perform any one or more of the functions of the user input system 340 described and/or contemplated herein. For example, the user 345 may use the user input system 340 to transmit and/or receive information or commands to and from the system 330. In some embodiments, for example, the user input system 340 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 3, in accordance with some embodiments of the present invention, the user input system 340 includes a communication interface 342, a processor 344, a memory 346 having a user application 347 stored therein, and a user interface 349. In such embodiments, the communication interface 342 is operatively and selectively connected to the processor 344, which is operatively and selectively connected to the user interface 349 and the memory 346. In some embodiments, the user 345 may use the user application 347 to execute processes described with respect to the process flow and interfaces described herein. Specifically, the user application 347 executes the process flow described in FIG. 1.

Each communication interface described herein, including the communication interface 342, generally includes hardware, and, in some instances, software, that enables the user input system 340, to transport, send, receive, and/or otherwise communicate information to and/or from the communication interface of one or more other systems on the network 310. For example, the communication interface 342 of the user input system 340 may include a wireless transceiver, modem, server, electrical connection, and/or other electronic device that operatively connects the user input system 340 to another system such as the system 330. The wireless transceiver may include a radio circuit to enable wireless transmission and reception of information. Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 347 of the memory 346 of the user input system 340.

Each memory device described herein, including the memory 346 for storing the user application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the user application 347. In some embodiments, the user application 347 includes an interface for communicating with, navigating, controlling, configuring, and/or using the user input system 340. In some embodiments, the user application 347 includes computer-executable program code portions for instructing the processor 344 to perform one or more of the functions of the user application 347 described and/or contemplated herein. In some embodiments, the user application 347 may include and/or use one or more network and/or system communication protocols.

Also shown in FIG. 3 is the user interface 349. In some embodiments, the user interface 349 includes one or more output devices, such as a display and/or speaker, for presenting information to the user 345. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 345. In some embodiments, the user interface 349 includes the input and display devices of a mobile device, which are operable to receive and display information.

FIG. 3 also illustrates a system 330, in accordance with an embodiment of the present invention. The system 330 may refer to the "apparatus" described herein. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. Therefore, the system 330 may be a server managed by the entity. The system 330 may be located at the facility associated with the entity or remotely from the facility associated with the entity. In some embodiments, such as the one illustrated in FIG. 3, the system 330 includes a communication interface 332, a processor 334, and a memory 336, which includes a system application 337 and a datastore 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flow described herein. The system application 337 may interact with the user application 347. It will also be understood that, in some embodiments, the memory includes other applications. It will also be understood that, in some embodiments, the system application 337 is configured to communicate with the datastore 338, the user input system 340, or the like.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the datastore 338. As used herein, the datastore 338 may be one or more distinct and/or remote datastores.

In some embodiments, the datastore 338 is not located within the system and is instead located remotely from the system. In some embodiments, the datastore 338 stores information or data described herein.

It will be understood that the datastore 338 may include any one or more storage devices, including, but not limited to, datastores, databases, and/or any of the other storage devices typically associated with a computer system. It will also be understood that the datastore 338 may store information in any known way, such as, for example, by using one or more computer codes and/or languages, alphanumeric character strings, data sets, figures, tables, charts, links, documents, and/or the like. Further, in some embodiments, the datastore 338 may include information associated with one or more applications, such as, for example, the system application 337. It will also be understood that, in some embodiments, the datastore 338 provides a substantially real-time representation of the information stored therein, so that, for example, when the processor 334 accesses the datastore 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. It will also be understood that the system 330 may include and/or implement any embodiment of the present invention described and/or contemplated herein. For example, in some embodiments, the system 330 is configured to implement any one or more of the embodiments of the process flows described and/or contemplated herein in connection any process flow described herein. Additionally, the system 330 or the user input system 340 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

All in all, the present invention provides the user with a faster, more secure method of authentication. The apparatus is configured to determine the authenticity of the user based on processing of a variety of received inputs, including touch screen, button, and biometric interactions. Rhythm-based user authentication can also deliver emotional and social benefits to the user. The user may enjoy hearing a song play along during the authentication process. A friend or colleague may hear the song and inquire about the authentication process.

What is claimed is:

1. A computer program product for authenticating a user based on a rhythmic pattern, the computer program product comprising a non-transitory computer-readable medium comprising code causing a first apparatus to:
receive an indication from a user to execute an action associated with an online banking application;
determine that the action is associated with one or more actions that require user authentication;
initiate a presentation of a predetermined sequence of musical notes associated with the action, wherein the predetermined sequence of musical notes are played on a speaker associated with a wearable computing device;
receive via at least one sensor a plurality of rhythmic inputs from the user to match the sequence of musical notes associated with the action, wherein the plurality of rhythmic inputs are received using the wearable computing device, the wearable computing device comprising a sensor configured to sense the plurality of rhythmic inputs from the user, wherein the plurality of rhythmic inputs comprise a combination of input types, wherein the input types comprise one or more inputs associated with one or more sensors associated with the wearable computing device and one or more inputs by physically pressing one or more buttons associated with the wearable computing device;
process the plurality of rhythmic inputs, wherein processing the plurality of rhythmic inputs includes comparing the plurality of rhythmic inputs received using the wearable computing device to the predetermined sequence of musical notes played on the speaker associated with the wearable computing device to determine that the plurality of rhythmic inputs matches at least one predetermined rhythmic pattern associated with authentication of the user, wherein processing the plurality of rhythmic inputs comprises determining at least an input type, an input length, an input duration, an input time, a length of time between the plurality of rhythmic inputs, a rhythm, a tempo, a velocity, and a pitch;
authenticate the user in response to determining that the plurality of rhythmic inputs matches the predetermined sequence of musical notes played on the speaker associated with the wearable computing device, wherein determining further comprises determining at least a partial match between the plurality of rhythmic inputs and at least one predetermined rhythmic pattern, wherein determining a partial match provides partial authentication of the user; and
enable the user to execute the action based on at least authenticating the user.

2. The computer program product of claim 1, wherein the wearable computing device is at least one of a bracelet, a ring, a watch, glasses, jewelry, a pen, or a stylus.

3. The computer program product of claim 1, wherein the apparatus is at least one of a smart phone, a tablet, a laptop, a computer, a mobile device, a personal digital assistant (PDA), or a touch screen computer.

4. The computer program product of claim 3, wherein the at least one sensor is associated with at least one of a touchscreen, a button associated with the apparatus, an application associated with the apparatus, or an operating system associated with the apparatus.

5. The computer program product of claim 1, wherein the plurality of rhythmic inputs includes at least one of a gesture, a button push, a button slide, a button hold, a button tap, a touchscreen swipe, a touchscreen push, a touchscreen slide, a touchscreen tap, a touchscreen hold, a touchscreen swim, a mouse click, a scroll, a toggle, a selection, a zoom, a knock, a download, a biometric interaction, an upload, or an action.

6. The computer program product of claim 5, wherein the plurality of rhythmic inputs is received via the at least one sensor as a rhythmic sequence of inputs spaced out by the user over a predetermined period of time.

7. The computer program product of claim 1, wherein music is played only when headphones are coupled to the apparatus.

8. The computer program product of claim 1, wherein the at least one predetermined rhythmic pattern is configurable by the user.

9. The computer program product of claim 1, wherein the at least one predetermined rhythmic pattern is associated with authentication of more than one user.

10. The computer program product of claim 1, wherein authenticating the user includes executing an action, wherein the action is at least one of a gesture, a transaction, a viewing of a summary of information, a deposit, a withdrawal, a selection, a download, an upload, a zoom, a scroll, a click, or a slide.

11. The computer program product of claim 1 comprising denying authentication of the user based on determining that the plurality of rhythmic inputs does not at least partially match at least one predetermined rhythmic pattern, wherein denying authentication of the user prompts the user via an interface for reattempting authentication of the user.

12. The computer program product of claim 1, wherein at least one of the plurality of rhythmic inputs or the at least one predetermined rhythmic pattern includes a combination of different inputs.

13. The computer program product of claim 1, wherein determining if the plurality of rhythmic inputs matches at least one predetermined rhythmic pattern associated with authentication of the user includes determining a level of complexity associated with the plurality of rhythmic inputs, wherein the level of complexity associated with the plurality of rhythmic inputs corresponds to a level of user access.

14. The computer program product of claim 13, wherein a predeterminedly high level of complexity corresponds to a predeterminedly high level of user access and a predeterminedly low level of complexity corresponds to a predeterminedly low level of user access.

15. A method for authenticating a user based on a rhythmic pattern, the method comprising:
receiving an indication from a user to execute an action associated with an online banking application;
determining that the action is associated with one or more actions that require user authentication;
initiating a presentation of a predetermined sequence of musical notes associated with the action, wherein the predetermined sequence of musical notes are played on a speaker associated with a wearable computing device;
receiving via at least one sensor a plurality of rhythmic inputs from the user to match the sequence of musical notes associated with the action, wherein the plurality of rhythmic inputs are received using the wearable computing device, the wearable computing device comprising a sensor configured to sense the plurality of rhythmic inputs from the user, wherein the plurality of rhythmic inputs comprise a combination of input types, wherein the input types comprise one or more inputs associated with one or more sensors associated with the wearable computing device and one or more inputs by physically pressing one or more buttons associated with the wearable computing device;
processing the plurality of rhythmic inputs, wherein processing the plurality of rhythmic inputs includes comparing the plurality of rhythmic inputs received using the wearable computing device to the predetermined sequence of musical notes played on the speaker associated with the wearable computing device to determine that the plurality of rhythmic inputs matches at least one predetermined rhythmic pattern associated with authentication of the user, wherein processing the plurality of rhythmic inputs comprises determining at least an input type, an input length, an input duration, an input time, a length of time between the plurality of rhythmic inputs, a rhythm, a tempo, a velocity, and a pitch;
authenticating the user in response to determining that the plurality of rhythmic inputs matches the predetermined sequence of musical notes played on the speaker associated with the wearable computing device, wherein determining further comprises determining at least a partial match between the plurality of rhythmic inputs and at least one predetermined rhythmic pattern, wherein determining a partial match provides partial authentication of the user; and
enabling the user to execute the action based on at least authenticating the user.

16. The method of claim 15, wherein the wearable computing device is at least one of a bracelet, a ring, a watch, glasses, jewelry, a pen, or a stylus.

17. The method of claim 15, wherein the apparatus is at least one of a smart phone, a tablet, a laptop, a computer, a mobile device, a personal digital assistant (PDA), or a touch screen computer.

18. The method of claim 17, wherein the at least one sensor is associated with at least one of a touchscreen, a button associated with the apparatus, an application associated with the apparatus, or an operating system associated with the apparatus.

19. The method of claim 15, wherein the plurality of rhythmic inputs includes at least one of a gesture, a button push, a button slide, a button hold, a button tap, a touchscreen swipe, a touchscreen push, a touchscreen slide, a touchscreen tap, a touchscreen hold, a touchscreen swim, a mouse click, a scroll, a toggle, a selection, a zoom, a knock, a download, a biometric interaction, an upload, or an action.

20. The method of claim 19, wherein the plurality of rhythmic inputs is received via the at least one sensor as a rhythmic sequence of inputs spaced out by the user over a predetermined period of time.

21. The method of claim 15, wherein music is played only when headphones are coupled to the apparatus.

22. The method of claim 15, wherein the at least one predetermined rhythmic pattern is configurable by the user.

23. The method of claim 15, wherein the at least one predetermined rhythmic pattern is associated with authentication of more than one user.

24. The method of claim 15, wherein authenticating the user includes executing an action, wherein the action is at least one of a gesture, a transaction, a viewing of a summary of information, a deposit, a withdrawal, a selection, a download, an upload, a zoom, a scroll, a click, or a slide.

25. The method of claim 15 comprising denying authentication of the user based on determining that the plurality of rhythmic inputs does not at least partially match at least one predetermined rhythmic pattern, wherein denying authentication of the user prompts the user via an interface for reattempting authentication of the user.

26. The method of claim 15, wherein at least one of the plurality of rhythmic inputs or the at least one predetermined rhythmic pattern includes a combination of different inputs.

27. The method of claim 15, wherein determining if the plurality of rhythmic inputs matches at least one predetermined rhythmic pattern associated with authentication of the user includes determining a level of complexity associated with the plurality of rhythmic inputs, wherein the level of complexity associated with the plurality of rhythmic inputs corresponds to a level of user access.

28. The method of claim 27, wherein a predeterminedly high level of complexity corresponds to a predeterminedly high level of user access and a predeterminedly low level of complexity corresponds to a predeterminedly low level of user access.

* * * * *